M. A. NEWSTETTER, DEC'D.
W. M. NEWSTETTER, ADMINISTRATOR.
AUTOMATIC ELECTRIC GENERATION SYSTEM.
APPLICATION FILED MAY 20, 1909.
955,986.
Patented Apr. 26, 1910.
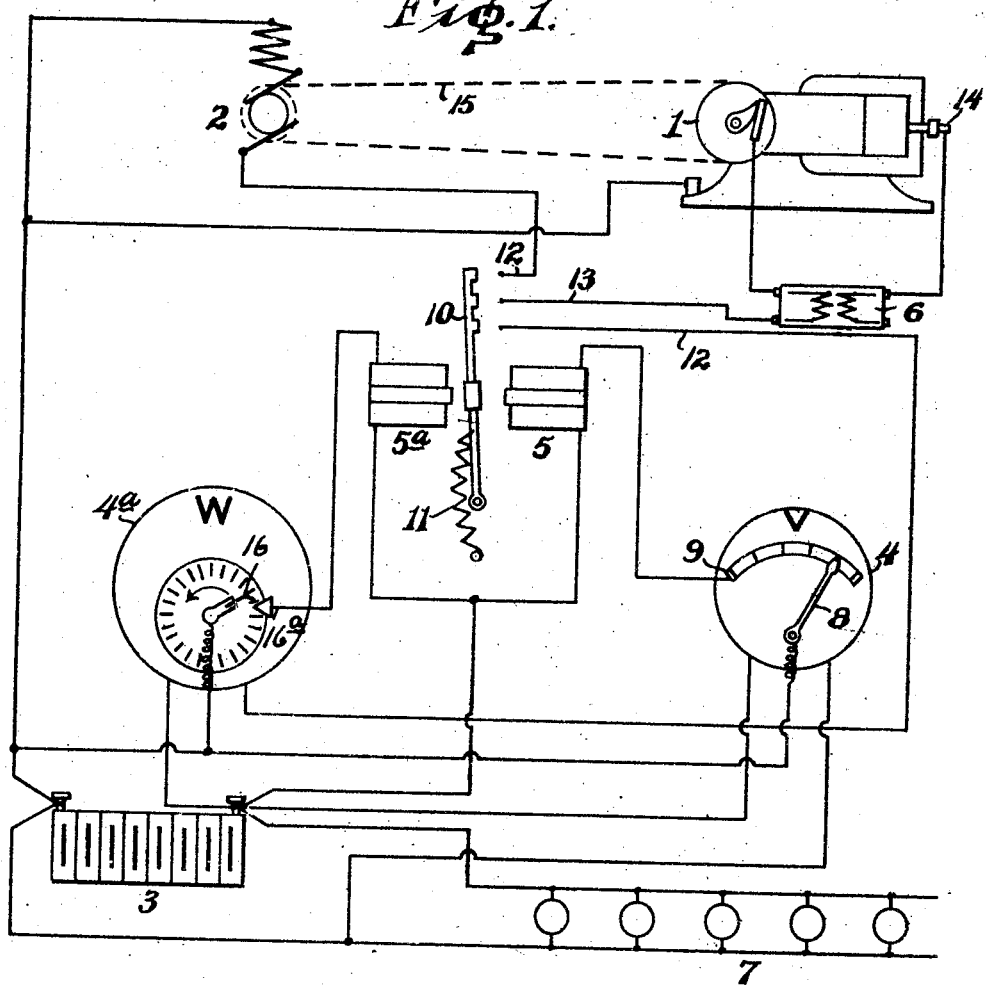
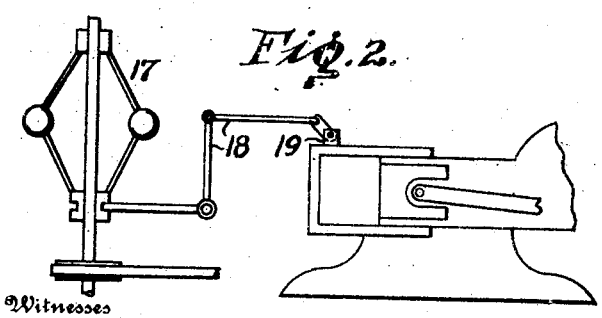

UNITED STATES PATENT OFFICE.

MALCOLM A. NEWSTETTER, OF READING, PENNSYLVANIA; WILLIAM M. NEWSTETTER ADMINISTRATOR OF SAID MALCOLM A. NEWSTETTER, DECEASED.

AUTOMATIC ELECTRIC-GENERATION SYSTEM.

955,986.  Specification of Letters Patent.  Patented Apr. 26, 1910.

Application filed May 20, 1909. Serial No. 497,301.

*To all whom it may concern:*

Be it known that I, MALCOLM A. NEWSTETTER, citizen of the United States, residing at Reading, in the county of Berks and State of Pennsylvania, have invented certain new and useful Improvements in Automatic Electric-Generation Systems, of which the following is a specification.

This invention relates to an automatic electric generation system (as distinguished from automatic controlling and circuit breaking devices) using an internal combustion or explosive engine as a prime motive power in connection with a suitable electro-magnetic machine and an electric storage battery or accumulator.

The objects of my invention are not only to provide means for charging the battery (the current from which may be used for any purpose) but to make these means entirely automatic in its operation; also to employ no other prime units to obtain this result other than the units of the plant, viz: the explosive motor, the electro-magnetic machine and the electric storage battery. In other words, to make the above units automatic in their operation and able to care for themselves, without the assistance of an attendant, starting, of course, with the battery partially charged.

A further object is to provide an arrangement wherein the battery is always connected to the circuit in the building where the current is to be used.

In connection with the above mentioned prime units I provide a voltmeter whose needle will close a circuit when the battery charge reaches a certain predetermined low point, and thus start the prime motor; and also, an instrument, preferably in the form of a wattmeter or an ampere hour meter, the operation of which will be largely dependent on the amount of electricity and the direction of its flow through the meter, to control the stopping of the said prime motor.

This system must not be confounded with systems wherein the explosive engine is started manually and the dynamo started and stopped at suitable times or connected and disconnected with the battery at suitable times, for, in my present system the means for charging the battery, and the battery itself are utilized as means for starting the engine to charge the battery.

The ignition circuit to the explosive engine is also controlled by the instruments which control the main circuit between the battery and the dynamo.

I also provide means for keeping the compression of the engine cylinder released until its momentum is sufficient to carry it past the compression point.

A further object is to provide means whereby the said electric storage battery is prevented from discharging below a certain predetermined point without starting the engine and dynamo to replenish the battery and to automatically stop said engine when a certain predetermined amount of electricity has passed into the battery.

In the drawing:—Figure 1 is a diagram of my system. Fig. 2 shows the compression releasing apparatus for the engine.

The numeral 1 designates the explosive engine; 2 the electro-magnetic machine; 3 the electric storage battery; 4 the voltmeter; 4ª the wattmeter; 5 and 5ª the magnets; 6 is the ignition coil and 7 the lights or equivalent.

Assuming that the plant is at rest, and the voltage, by reason of burning of lights or other cause, is reduced until the needle 8 on the voltmeter reaches the predetermined point where it contacts with the electric terminus 9, this contact will close the circuit leading from the battery through the voltmeter to the magnet 5 and cause it to draw the pivoted arm 10 toward it. This arm is provided with a spring 11 so placed that it will keep the arm in either position placed by the magnets. When this arm moves toward the magnet 5 the free end will contact with the terminals 12 of the main circuit and close said circuit; simultaneously with said action, the arm will also contact with the terminal 13 of the ignition circuit and produce the initial spark in the engine to which it is connected at the spark plug 14.

It will be seen that in this manner the electro-magnetic machine will first operate as a motor, and inasmuch as it is connected by a belt 15 with the engine, it will start the said engine and permit it to draw its first charge and begin its action. When the engine has thus been started, it in turn will give motion to the electro-magnetic machine through the same belt connection, and thus convert it into a dynamo, and this dynamo will begin to charge the battery. When a certain predetermined amount of electricity has passed through the meter 4ª to the battery, the needle 16 on the meter will contact with the electric terminus 16ª and energize the magnet 5ª to which it is connected. This action will cause the said magnet to draw the arm 10 away from the magnet 5 and toward the magnet 5ª and thus break the contacts at 12 and 13 and stop the engine.

In Fig. 2 I have shown how the compression is released in the engine cylinder. In this view the numeral 17 designates the governor connected by a crank arm and rod 18 to the petcock 19 in the cylinder. When the engine begins to move, there would not, with the cock closed, be sufficient power to draw and compress the initial charge. In this construction the cock is open and remains so until the engine gains sufficient speed to throw out the governors, which also, through the crank arm and rod 18 will close the petcock and by that time the engine has gained sufficient speed to draw and compress the charge.

It is evident that my system comprises an automatic means for operating a plant of the class described, as the circuit for starting the engine, through which the battery is charged by means of the electro-magnetic machine, is automatically closed after the voltage of the battery has been reduced to a certain predetermined point, as indicated by the voltmeter; and in like manner the circuit by means of which the engine is stopped, is automatically closed when a certain predetermined amount of electricity has passed through the wattmeter into the storage battery.

What I claim is:—

1. In an automatic electric generation system, an explosive engine, an electro-magnetic machine, an electric storage battery, means responsive to the condition of the charge of the battery for starting the engine, and means controlled by the direction of flow and amount of electricity passing therethrough for stopping the engine.

2. In an automatic electric generation system, an explosive engine, an electro-magnetic machine, an electric storage battery, an instrument responsive to the condition of the charge of the battery for starting the engine and an instrument controlled by the direction of flow and amount of electricity passing therethrough for stopping the engine.

3. In an automatic electric generation system, a prime motor, an electro-magnetic machine, an electric storage battery, an instrument responsive to the condition of the charge of the battery for starting the motor, and an instrument controlled by the direction of flow and amount of current passing through said instrument for stopping the motor.

In testimony whereof I affix my signature, in presence of two witnesses.

MALCOLM A. NEWSTETTER.

Witnesses:
 ED. A. KELLY,
 ELMER W. DECK.